April 25, 1944.  M. L. OLSON  2,347,498
FLUX DISPENSING PROCESS AND APPARATUS
Filed July 20, 1940
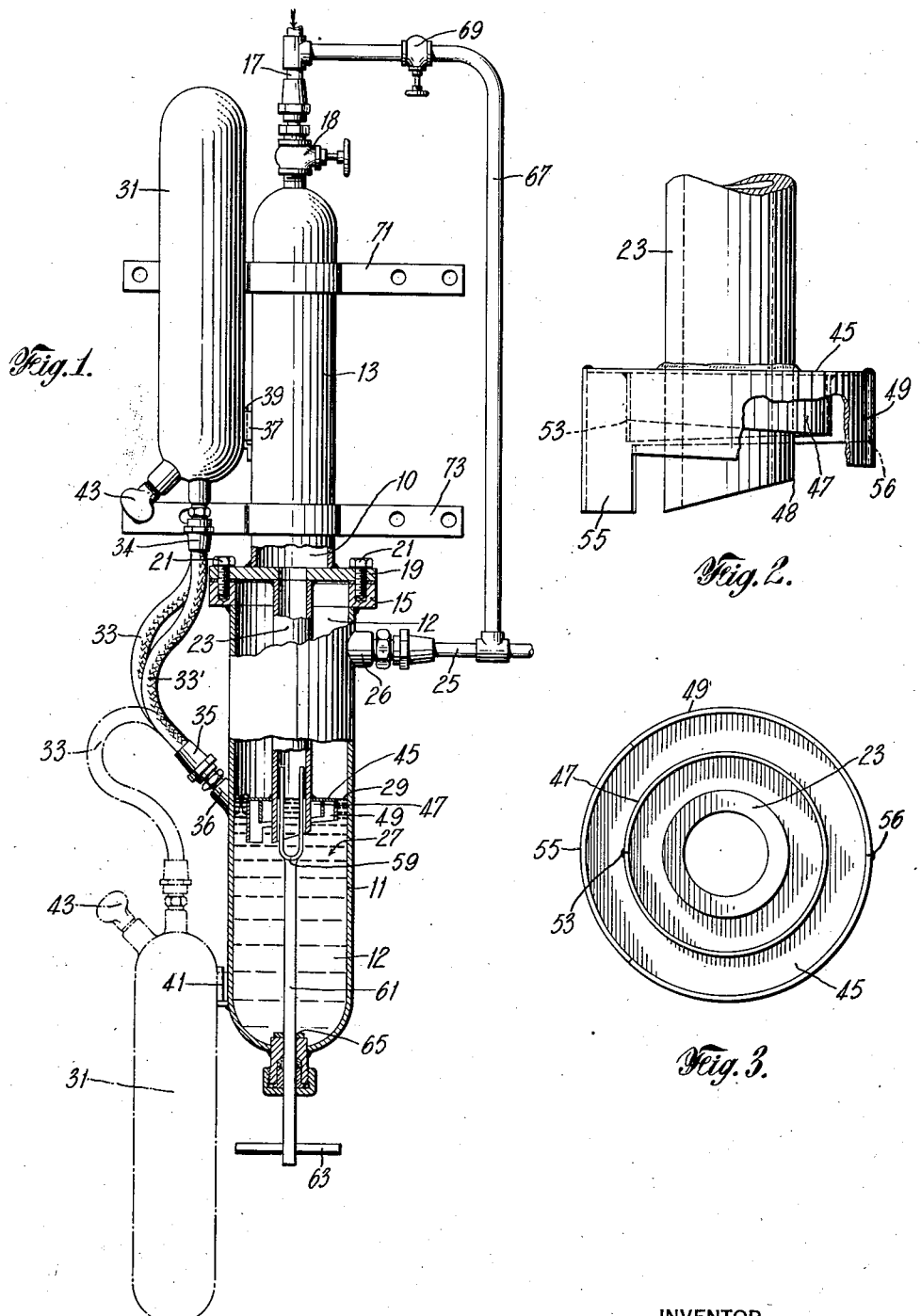
INVENTOR
MALVEN L. OLSON
BY
ATTORNEY Patented Apr. 25, 1944

2,347,498

UNITED STATES PATENT OFFICE 2,347,498

FLUX DISPENSING PROCESS AND APPARATUS

Malven L. Olson, Indianapolis, Ind., assignor to Union Carbide and Carbon Corporation, a corporation of New York Application July 20, 1940, Serial No. 346,669

16 Claims. (Cl. 23—2)

This invention relates to the art of dispensing volatilizable or volatile fluxes; and more especially it concerns a novel process and apparatus for dispensing within a welding gas a uniform selected amount of a volatile or volatilizable flux—that is, one which is either a liquid or a gas at ordinary temperatures but is employed in the form of a vapor or gas. The invention has especial utility in connection with welding or brazing operations using volatile organic compounds which readily hydrolyze in the presence of moisture, and in operations utilizing moisture-laden welding gases produced and flowing to the welding zone under very low superatmospheric pressure. An example of such a low pressure welding gas is that known by the trade as "low pressure-generated acetylene" which is generated at pressures of not more than one pound per square inch (gauge), and which is saturated with moisture under the conditions of its generation. Another example thereof is the so-called "medium pressure-generated acetylene," which is produced under a pressure of not over fifteen pounds per square inch (gauge), and which also is saturated with moisture.

Methods already are known for utilizing volatile fluxes in welding and brazing operations, involving the introduction of a welding gas within a body of such a flux, and conducting the resultant flux-impregnated gas to the welding zone. Most of such methods possess certain disadvantages when using wet gases, due to the fact that many of the most effective volatile fluxes, such as the lower alkyl borates and silicates, are readily hydrolyzed by moisture. Upon hydrolysis, these compounds deposit the free acids in solid state—as boric acid, silicic acid, etc. Should these deposits occur in the gas passages in the blowpipes and other parts of the welding, dispensing and associated apparatus, such passages gradually become plugged so as seriously to interfere with the continuity and uniformity of the welding operation. Prior to this invention, when using flux dispensing apparatus wherein a welding gas was introduced below the liquid flux level within a flux container, in order to insure adequate fluxing it was deemed necessary for the gas inlet to extend five inches or more below the surface of the liquid flux. Such apparatus was subject to the serious objection that acetylene pressure losses were unduly great when attempting to flux adequately low pressure acetylene. For effective low pressure acetylene welding service it is essential that gas pressure losses be minimized, while at the same time providing an adequate amount of flux. Such prior known apparatus was subject to the further objection that in the event of the development of back pressure in the line connecting the flux dispenser with the blowpipe or blowpipes, the flux was forced out of the dispenser into the gas system and into the hydraulic back pressure valve, with the result that the latter often was rendered inoperative, and it was necessary to discontinue the welding operation and clean the system.

Among the more important objects of the present invention are: To dispense uniformly within a welding gas a selected amount of a volatile flux while minimizing the back pressure drop in the welding gas; to provide in novel manner for passing a welding gas through a body of a volatile flux while avoiding substantial loss in pressure head of the welding gas; to provide in novel manner for dispensing a hydrolyzable volatile flux within a welding gas containing moisture while preventing clogging of the dispenser by deposited products of flux hydrolysis; to provide for preventing flooding of the gas inlet line to the flux dispenser and the hydraulic back pressure valve associated therewith in the event that back pressure occurs in the line connecting the dispenser and a welding blowpipe. These and other objects will be apparent from the following description.

Referring to the accompanying drawing illustrating one modification of the invention, Fig. 1 is an elevation of the dispenser and associated parts, portions being broken away, and others being shown in section;

Fig. 2 is an enlarged view in elevation of one form of gas inlet and baffle construction; and Fig. 3 is a bottom view of the baffle of Fig. 2.

Referring to the drawing, the flux dispenser includes two vertically disposed, detachably interconnected hollow steel casings 11, 13, each having an open end and an opposite rounded closed end.

A flange 15 at the open end of casing 11 mates with a corresponding flanged margin of a centrally-apertured plate 19 welded to the open end of casing 13. A gasket of suitable material is disposed between the mating flanges, and forms a fluid-tight joint, when the casings are secured together, as by bolts 21. The plate 19 separates the resultant assembly into an upper overflow or safety chamber 10, and a lower flux dispensing chamber 12, in permanent communication through the central aperture in plate 19. A conduit 17 connects the upper end of casing 13 with a source of a welding gas under selected pressure. Conduit 17 may have a cut-off valve 18 therein.

An open-ended metal pipe 23 has one end welded to the underside of plate 19 surrounding the central aperture therein. The lower margin of pipe 23 extends downwardly within casing 11 to a point midway of the casing, and lies in a sloping plane relative to the longitudinal axis of the pipe. A gas outlet conduit 25 connects a gas outlet 26 in the upper end of casing 11 with a gas manifold, blowpipe, or other point of use of the flux-impregnated gas.

The internal capacity of chamber 10, plus the internal capacity of inlet pipe 23, are greater than the combined capacities of flux reservoir 31; that portion of chamber 12 surrounding pipe 23 and disposed between the liquid level 29 and the lower end of pipe 23; and tubes 33, 33'. Consequently, in the event of back pressure occurring in dispenser outlet line 25, the main body of flux cannot be forced back into the welding gas inlet line 17, and into the hydraulic valve, and pressure regulator in such line—and cannot flow rearwardly beyond chamber 10.

The arrangement of parts is such that a welding gas enters the dispenser from line 17, flows through tube 23, and leaves through outlet 26. For maintaining at all times within chamber 12 a body of volatile flux 27 having a fixed surface level 29, a fluid-tight flux reservoir member 31 of suitable metal has an end thereof connected with the midportion of the chamber 12 by at least one, and preferably two flexible tubes 33, 33', which tubes may be standard acetylene hose, with associated fittings 34, 35. The fittings 35 are connected with upwardly open flux inlet members 36 welded to or formed in casing 11, at an angle which conveniently may be approximately 45° with the horizontal. A welded steel lug or strap 37, on the reservoir 31 near the end connected with tubes 33, 33', cooperates with a companion lug 39 formed on the lower portion of casing 13, for supporting the reservoir 31 in operating position during use of the dispenser. A similar lug 41 is formed on casing 11 near its lower end, and cooperates with lug 37 for holding the reservoir in the position shown in dot-and-dash lines in Fig. 1, during refilling of the reservoir.

A flux inlet, provided with a removable plug 43, is formed in the end of reservoir 31 connected with tubes 33, 33'.

In order that the welding gas entering through line 17 may have ample opportunity to pick up an adequate amount of flux to meet the requirements of a particular welding operation, while avoiding such loss of head as would interfere with the flow of welding gas required for that particular welding operation, the lower end of pipe 23 is disposed slightly below the flux inlets 36. Welded or otherwise secured to the pipe 23 adjacent its lower end is an annular baffle plate 45 having secured thereto the upper margins of depending concentric shallow inner and outer tubular baffles 47, 49, respectively of non-uniform height. That portion 53 of the lower margin of baffle 47 nearest plate 45 preferably is disposed upon the side of baffle 47 opposite the portion 48 of the tapered lower margin of tube 23 nearest plate 45, and desirably is nearer to that plate than is said portion 48.

Baffle 49 has a side wall portion cut away to provide a stepped gas-deflecting surface 55, as shown in Figs. 2 and 3, and two sloping surfaces. That portion 56 of the lower margin of baffle 49 nearest to plate 45 preferably is disposed opposite that portion 53 of the lower margin of baffle 47 nearest plate 45, and preferably is further from that plate than is said portion 53. The arrangement is such that welding gas normally flows from pipe 23 below the surface of the flux body, then successively below each shallow baffle, and thence to the surface of the flux, thus increasing the length of the path of travel of the gas in contact with the flux without causing objectionable back pressure, while breaking up gas bubbles and assuring proper intimate contact of the gas and flux under conditions favoring the volatilization of the maximum amount of flux within the welding gas during a short time of exposure. Under this set of conditions a flux head of only 1.5 inches is ample for fluxing the welding gas when using an approximately azeotropic mixture of triethyl borate in ethyl alcohol; and a still smaller flux head may be utilized effectively, especially when using fluxes of higher volatilities, such as trimethyl borate.

Obviously, when using such extremely small flux heads for complete impregnation of a welding gas, it is highly important that the flux level be maintained substantially uniform. This is effectively accomplished by the apparatus herein described. The plate and baffle construction of the type hereinbefore described are extremely important features of the invention since, if not used, the gas would pass through the flux body in large bubbles; and efficient flux pickup would not occur.

When fluxing a welding gas containing moisture, such as a low pressure-generated acetylene, or a medium pressure-generated acetylene, the moisture present in the gas rapidly hydrolyzes such hydrolyzable volatile fluxes as the alkyl borates and silicates, with the resultant deposition of gelatinous boric acid or silicic acid. Concurrently the welding gas is dried and impregnated with volatile flux. The gelatinous product of hydrolysis precipitates within the chamber 12 and, to some extent, within the lower end of tube 23 which extends below the liquid flux level.

To prevent any possible interference with the uniform flow of welding gas to the welding zone when using a moist welding gas, due to any gradual clogging of the gas inlet line 23 by such solid product, a U-shaped scraper 59, mounted upon a rotatable and longitudinally movable shaft 61, is adapted to be introduced within the lower end of pipe 23, and to contact and scrape the inner wall of said pipe. The lower end of shaft 61 extends through a stuffing box on casing 11, and carries a handle 63 for rotating and raising and lowering the scraper. An annular member 65 welded to shaft 61 limits downward movement of that shaft.

The gas inlet line 17 has therein the usual pressure regulator (not shown) for maintaining the gas under a uniform selected pressure; and it has a standard hydraulic back pressure valve (not shown). For feeding unfluxed welding gas to the welding zone, when desired for preheating the work or for other purposes, a bypass line 67, having therein a regulating valve 69, directly connects the welding gas inlet line 17 and outlet line 25. In instances where a dry welding gas is used, the amount of flux being fed to the welding zone may be regulated by means of valves 18 and 69, to adjust the portion of the gas flowing through the liquid flux. When using a wet gas, valves 18 and 69 are not concurrently open.

The flux dispenser may be supported upon a wall, floor, or the like in any suitable manner, as, for example, by means of the brackets 71, 73, illustrated.

The following illustrates one preferred modification of the invention using the apparatus illustrated. Assuming the chamber 12 to be filled with a volatile flux, such as a 50% solution of triethyl borate in ethyl alcohol, up to the liquid level shown, and the reservoir 31 to be at least partly filled with the flux, a welding gas such as a low pressure-generated acetylene—preferably maintained under a uniform selected pressure, is introduced from line 17 within the upper layer of the body of flux in chamber 12. The gas flows successively under the series of baffles located adjacent the surface of the flux body, and thence to the surface of the liquid and to the outlet 26.

Preferably, the baffles are so constructed and arranged that the gas during such passage is never more than two inches below the surface of the flux body, a time of gas-flux contact adequate for thorough impregnation of the gas being secured by moving the gas laterally of the surface of the liquid flux, and near to but below the said surface. The flux-impregnated gas then flows directly to the welding blow-pipe or other point of use. As the flux level in chamber 12 falls below flux inlet 36, gas in flux chamber 12 flows through tubes 33, 33', to the reservoir 31, and allows a corresponding volume of flux to flow from the latter to chamber 12 and maintain the fixed liquid level in the latter, in well-known manner. When it becomes necessary to refill reservoir 31, it may be lifted from lug 39, inverted, and mounted upon lug 41, as shown in dot-and-dash lines in Fig. 1. Previously thereto the gas flow to the blowpipes is cut off; and valve 18 is closed. Plug 43 then may be removed, the reservoir refilled, the plug replaced, and the reservoir returned to the operating position.

When using a welding gas containing moisture, the latter may be dried in suitable manner prior to entering the dispenser. However, when using low pressure- or medium pressure-generated acetylene, or other low pressure gas containing moisture, in conjunction with a hydrolyzable volatile flux, it often is convenient to utilize the flux both as a drying agent and a fluxing agent. In such instances it is preferred to use a lower alkyl borate, such as methyl, ethyl, propyl or isopropyl borate—or a solution of such a borate in an aliphatic alcohol or other volatile solvent therefor which forms with said borate an azeotropic or constant boiling mixture, the said solution being substantially richer in said borate than said azeotropic mixture. Thus a 50% solution of triethyl borate in ethyl alcohol, or a solution of 85% or more trimethyl borate in methyl alcohol, gives satisfactory results.

The excess of alkyl borate, or other hydrolyzable flux, over that which is present in the azeotropic mixture that is vaporized, effectively dries the gas. The small amount of boric acid or the like concurrently formed may be recovered periodically from the dispenser.

Occasionally a few turns of scraper handle 69 removes any matter deposited within pipe 23 and, in conjunction with the detergent action of the liquid flux, prevents objectionable clogging of the inlet line under all conditions of operation.

Cut-off valves (not shown) may be placed in flux lines 33, 33', adjacent the fittings 36, whereby the reservoir 31 may be refilled without interrupting operation of the dispenser.

The use of the invention has resulted in a highly practicable procedure and apparatus for continuously feeding to a welding zone the exact amount of a welding gas required for a given welding operation, while concurrently supplying continuously within the welding gas the amount of any selected volatile flux found most suitable for fluxing that operation. Such results are secured even when the gas flows to the flux dispenser under pressures of less than one pound per square inch, and is saturated with moisture which cannot readily be removed by the usual driers without serious loss of pressure head, and the use of bulky, costly apparatus. The relatively small, compact dispenser of this invention is able to flux relatively large volumes of a wet, low pressure welding gas.

The invention is susceptible of modification within the scope of the appended claims.

I claim:

1. Process for dispensing a volatile flux within a welding gas, which comprises introducing a welding gas under a selected relatively constant low pressure within a body of a volatilizable liquid flux at a point therein near but below the surface level of said body, thence flowing the gas along an extended devious path within said flux body while maintaining said gas at all times closely adjacent the surface of said body, thereby impregnating the gas with vapors of said flux while minimizing back-pressure in said flowing stream of gas, and withdrawing the flux-impregnated gas.

2. Process for dispensing a volatilizable flux within a welding gas, which comprises introducing a stream of a moisture-containing welding gas within a body of hydrolyzable volatilizable flux having a surface continuously maintained at a substantially constant level, said gas being introduced at a point near but below the surface level of said body, said flux comprising a lower alkyl borate, flowing the gas along an extended devious path all portions of which are within said flux body closely adjacent the surface of the latter, thereby drying said gas and concurrently impregnating the resultant dry gas with said volatile flux, and withdrawing the flux-impregnated gas substantially free from solid particles formed by the hydrolysis of said alkyl borate flux in the presence of moisture.

3. Process for dispensing a volatile liquid flux within a combustible gas containing a component reactive with said flux, which comprises introducing a stream of said gas a selected short distance below the free surface of a body of volatile liquid flux within an enclosed space while maintaining said free surface of the flux at a fixed level, flowing said stream of gas successively across the lower end of each of a series of low imperforate baffles completely submerged in said liquid flux while directing said gas stream laterally of the free surface of said body of flux and maintaining the gas at all times closely adjacent the said free surface, and withdrawing the resultant flux-impregnated gas substantially free from solid products of reaction between said flux and said component of the gas.

4. Apparatus for dispensing a volatile flux within a combustible gas, which comprises a flux chamber; a closely adjacent liquid overflow chamber connected therewith and located thereabove; means for maintaining a body of a liquid flux in said flux chamber with its upper surface at a constant level; means establishing permanent communication between said flux chamber and said overflow chamber and arranged to drain liquid by gravity from the overflow chamber to the flux chamber, the last-named means comprising a conduit having a discharge end extending a short distance below the flux level in said flux chamber and an inlet end in the lower portion of said overflow chamber; a plurality of spaced low baffles surrounding the discharge end of said conduit and each having a portion of minimum height, the portion of minimum height of each baffle being remote from a corresponding point of the next adjacent baffle, thereby conducting gas along an extended lateral path immediately below the surface of said flux; means for conducting a welding gas to said overflow chamber; and means for conducting flux-impregnated welding gas from said flux chamber.

5. Flux dispensing apparatus comprising a flux chamber, and a superposed liquid overflow chamber communicating with said flux chamber; a gas inlet connected with said overflow chamber; a gas outlet connected with said flux chamber; means for maintaining a body of a liquid flux in said flux chamber with the upper flux surface at a constant level, said last-named means comprising a flux reservoir having a flux inlet, means for quickly and detachably securing said reservoir to a wall of said overflow chamber above the surface level of liquid in the flux chamber, and at least one conduit connecting said reservoir with said flux inlet; and means for detachably securing said reservoir to a wall of said flux chamber below the surface level of liquid in the latter, said conduit being arranged to maintain communication between said flux reservoir and said flux chamber during transfer of the reservoir from one of said securing means to the other.

6. Flux dispensing apparatus, which comprises a flux chamber; a liquid overflow chamber connected therewith; means for maintaining a body of a liquid flux in said flux chamber with the upper flux surface at a constant level, said last-named means comprising a flux reservoir detachably secured to a wall of said overflow chamber, and at least one flexible conduit connecting said reservoir with a flux inlet in a wall of said flux chamber; means establishing permanent communication between said flux chamber and said overflow chamber, the last-named means comprising a tubular member having a discharge end extending within said flux chamber to a point therein below the level of said flux inlet; said overflow chamber and tubular member together having a greater volumetric capacity than the combined capacities of said flux reservoir, said flexible conduit, and that portion of said flux chamber surrounding said tubular member and lying between the level of said flux inlet and the lower end of said tubular member; means for conducting a welding gas to said overflow chamber; and means for conducting flux-impregnated welding gas from said flux chamber.

7. Flux dispensing apparatus, which comprises a flux chamber; a liquid overflow chamber connected therewith; means for introducing a welding gas into said overflow chamber; means for withdrawing flux-impregnated gas from said flux chamber; means for introducing liquid flux within said flux chamber and for maintaining a uniform surface level of flux in that chamber; and means establishing permanent communication between said overflow chamber and said flux chamber, said last-named means comprising a tubular member having its lower end disposed below the surface level of flux in said flux chamber, a baffle support secured to said tubular member, and a plurality of spaced low annular baffles secured to and extending downwardly from said baffle support, each of said baffles having a portion of minimum height located adjacent a different side of said tubular conduit from the corresponding portion of an adjacent baffle, thereby causing the gas to flow along an extended path all portions of which are within the flux body closely adjacent the surface thereof.

8. Flux dispensing apparatus, which comprises a flux chamber; a liquid overflow chamber connected therewith; means for introducing a welding gas into said overflow chamber; means for withdrawing flux-impregnated gas from said fluxing chamber; means for introducing a liquid flux into the flux chamber and for maintaining therein a body of liquid flux at a constant level; means establishing permanent communication between said flux chamber and said overflow chamber, the last-named means comprising a tubular conduit having its lower margin lying in a slanting plane relative to the longitudinal axis of said conduit, a baffle support secured to and surrounding said tubular conduit, and a plurality of low baffles of non-uniform tubular conduit, and a plurality of spaced low annular downwardly extending baffles depending from said support adjacent the outlet of said tubular conduit and having at least a portion of their lower margins sloping downwardly, that portion of the lower margin of each of said baffles located nearest said baffle support being at a different side of the tubular conduit than the corresponding portion of an adjacent baffle, thereby causing the gas to flow along an extended path within the flux body closely adjacent the surface thereof.

9. Flux dispensing apparatus, which comprises a flux chamber; a liquid overflow chamber connected therewith; means for introducing a welding gas into said overflow chamber; means for withdrawing flux-impregnated gas from said flux chamber; a valve-controlled conduit directly connecting the two last-named means; means for introducing a liquid flux into the flux chamber and for maintaining therein a body of liquid flux at a constant level; means establishing permanent communication between said flux chamber and said overflow chamber, the last-named means comprising a tubular conduit having its lower margin sloping relative to the longitudinal axis of said conduit, a baffle plate and support adjacent the lower end of said tubular conduit, and a series of imperforate low baffles of non-uniform height immersed in a body of flux in the flux chamber immediately below the surface level of the flux, said baffles being operatively associated with said baffle support and adapted to direct the flow of gas from said tubular conduit along a devious path, that portion of the lower margin of each baffle nearest to said baffle support being disposed at the opposite side of said tubular conduit from the corresponding portion of the lower margin of the next adjacent baffle.

10. Flux dispensing apparatus, which comprises a flux chamber; a liquid overflow chamber; means for introducing a gas within said liquid overflow chamber; means for withdrawing flux-impregnated gas from said flux chamber; means for feeding liquid flux to said flux chamber, and for maintaining in the latter a body of flux having the surface thereof at a constant level; means establishing permanent communication between said flux chamber and said overflow chamber, the last-named means comprising a gas conduit having a discharge end extending a short distance below the surface level of the flux in said flux chamber, and a plurality of spaced annular low baffles of non-uniform height surrounding said tubular conduit adjacent the discharge end, each of said baffles having a portion of minimum height located adjacent a different side of said tubular conduit than the corresponding portion of an adjacent baffle; and adjustable means operatively associated with said flux chamber for removing deposits of gelatinous material from the interior of said tubular conduit.

11. Flux dispensing apparatus, which comprises a flux chamber; a liquid overflow chamber connected therewith; means for introducing a gas within said overflow chamber; means for withdrawing flux-impregnated gas from said flux chamber; means for introducing a liquid flux within said flux chamber and for maintaining a body of flux therein with its surface at a fixed height, said last-named means comprising a flux reservoir detachably secured to a wall of said overflow chamber, and at least one flexible tubing connecting said reservoir and a flux inlet connection to said flux chamber; means establishing permanent communication between said flux chamber and said overflow chamber, and comprising a tubular conduit secured to said overflow chamber and having a discharge end extending within said flux chamber to a point a short distance below the level of said flux inlet; a plurality of spaced annular low imperforate baffles of non-uniform height surrounding said tubular conduit adjacent the discharge end, each of said baffles having a portion of minimum height located adjacent the opposite side of said tubular conduit from the corresponding portion of an adjacent baffle; and adjustable means for removing deposits of gelatinous material from the interior of said tubular conduit.

12. Apparatus for dispensing a volatile flux within a combustible gas, which comprises a flux chamber; means for maintaining a body of a liquid flux in said flux chamber with the surface of the flux at a constant level; means for conducting gas to said flux chamber, the last-named means comprising a conduit having a discharge end extending a short distance below the liquid level in said flux chamber; circuitous flow means including a plurality of spaced annular baffles associated with said conduit and interconnected with each other and with said conduit at their upper margins, each baffle having a portion of minimum height disposed at a point remote from a corresponding portion of the next adjacent baffle for directing a stream of gas back and forth in intimate contact with said body of flux below and laterally of the free surface of the body of flux and closely adjacent said free surface along an extended devious path; and means for conducting flux-impregnated gas from said flux chamber.

13. Process for dispensing a volatilizable flux within a combustible gas, which comprises maintaining a body of a liquid flux in an enclosed space with a free surface of said flux at a constant level, introducing a stream of a combustible gas from a gas inlet line into the body of liquid flux at a selected short distance below the surface level of said liquid flux body, flowing said stream of gas along an extended path below but adjacent the free surface of said liquid flux body, conducting flux-impregnated gas from said enclosed space through an outlet passage, and preventing back flow of said liquid flux into the said gas inlet line in the event of the development of back pressure within the said outlet passage.

14. Apparatus for dispensing a volatile flux within a welding gas, which apparatus comprises a flux chamber; a liquid overflow chamber; means for maintaining a body of a volatile flux in said flux chamber with the free surface of the flux at a constant level; means establishing permanent communication between said flux chamber and said overflow chamber, said means comprising a conduit having a discharge end disposed within said flux chamber, and adjustable means operatively associated with said conduit for removing deposits of gelatinous material from the interior of said conduit; a plurality of spaced baffles operatively associated with said conduit and respectively disposed adjacent to but spaced laterally of the discharge end of said conduit, at least a portion of the lower margin of each baffle sloping downwardly, and the portion of each baffle of minimum height being disposed on a different side of said conduit than the corresponding portion of the next adjacent baffle, thereby directing a flow of gas along an extended lateral path through the flux closely adjacent the surface of the latter with their lower margins close to but below the free surface of the flux; means for conducting a welding gas to said overflow chamber; and means for conducting flux-impregnated welding gas from said flux chamber.

15. That process of impregnating a welding gas having a relatively low pressure with a volatilizable liquid flux which includes maintaining a body of the liquid flux with a free surface at a substantially constant level in a closed chamber, introducing the gas at a relatively constant selected pressure into the flux near but below the surface thereof, flowing the gas along an extended predetermined circuitous path laterally through the flux at all times immediately below its surface and under conditions substantially minimizing loss of pressure head, impregnating the gas with flux while flowing the gas along said path, and withdrawing the flux-impregnated gas from said body.

16. Apparatus for dispensing a volatile flux within a combustible welding gas which comprises a flux chamber; a closely adjacent liquid overflow chamber detachably connected therewith and located thereabove; means for maintaining a body of liquid flux in the flux chamber with its upper surface at a constant level; means connecting said flux chamber and said overflow chamber and arranged to drain liquid by gravity and to flow gas from said overflow chamber to said flux chamber, the last-named means comprising a conduit having a discharge outlet located a short distance below the flux level in said flux chamber; control means associated with said discharge outlet and including a baffle support and a plurality of spaced low baffles depending from said support, at least a portion of the lower margin of each baffle being tapered, that portion of each baffle of minimum height being disposed at a different side of said conduit than the corresponding portion of the next adjacent baffle, thereby directing gas flowing to the flux chamber through said conduit along an extended circuitous lateral path closely adjacent to the surface of the flux; means for conducting a welding gas to said overflow chamber; and means for conducting flux-impregnated welding gas from said flux chamber.

MALVEN L. OLSON.